(12) United States Patent
Cimmino et al.

(10) Patent No.: US 12,522,144 B2
(45) Date of Patent: Jan. 13, 2026

(54) TREAD SYSTEM FOR A VEHICLE (71) Applicant: Bode—Die Tür GmbH, Kassel (DE)

(72) Inventors: Marco Cimmino, Kassel (DE); Ulrich Arend, Kassel (DE)

(73) Assignee: BODE—DIE TÜR GMBH, Kassel (DE)

(*) Notice: Subject to any disclaimer, the term of this patent is extended or adjusted under 35 U.S.C. 154(b) by 275 days.

(21) Appl. No.: 18/320,572

(22) Filed: May 19, 2023

(65) Prior Publication Data
US 2023/0382307 A1  Nov. 30, 2023

(30) Foreign Application Priority Data
May 30, 2022  (DE) ...................... 20 2022 103 042.1

(51) Int. Cl.
  *B60R 3/02*  (2006.01)
(52) U.S. Cl.
  CPC ....................................... *B60R 3/02* (2013.01)
(58) Field of Classification Search
  CPC .. B60R 3/02; B60R 3/002; B60R 3/00; B60R 3/007; B60R 3/04; B61D 23/00; E06C 7/081; E04F 11/104; E04F 11/112
  See application file for complete search history.

(56) References Cited

U.S. PATENT DOCUMENTS

| | | | | |
|---|---|---|---|---|
| 2,156,777 A | * | 5/1939 | Duryea | B61D 23/00 52/180 |
| 3,627,502 A | * | 12/1971 | Rees | E04F 15/02172 404/19 |
| 10,011,231 B1 | * | 7/2018 | Wymore | B60R 3/002 |
| 12,252,096 B2 | * | 3/2025 | McNeely | B60R 3/00 |
| 2002/0018908 A1 | | 2/2002 | Smith et al. | |

FOREIGN PATENT DOCUMENTS

| | | | | |
|---|---|---|---|---|
| CN | 202783218 U | | 3/2013 | |
| CN | 105644573 A | * | 6/2016 | ............ B61D 23/00 |
| CN | 105799600 A | | 7/2016 | |
| CN | 209208767 U | | 8/2019 | |
| CN | 211107418 U | | 7/2020 | |
| CN | 212195444 U | | 12/2020 | |
| CN | 113715738 A | * | 11/2021 | ............... B60R 3/02 |

(Continued)

*Primary Examiner* — Steve Clemmons
(74) *Attorney, Agent, or Firm* — CANTOR COLBURN LLP (57) ABSTRACT

A tread system for a vehicle includes a tread plate, which is movable, underneath a tread strip edge of the vehicle, from a retracted position in the direction towards a deployed position and vice versa along a deployment axis extending perpendicularly to the tread strip edge. The tread plate has a tread surface capable of bearing tread loads, on which an anti-slip profile is formed, wherein the anti-slip profile has profile elements, wherein each profile element is raised relative to a tread surface base and has a greater length along a respective longitudinal profile element axis than along a transverse profile element axis that extends perpendicularly to the longitudinal profile element axis and parallel to the tread surface base.

In order for the tread plate to be capable of being cleaned in a simplified manner and with improved efficiency, it is proposed that the profile elements are arranged in rows.

16 Claims, 4 Drawing Sheets

(56) References Cited

FOREIGN PATENT DOCUMENTS

| | | | | |
|---|---|---|---|---|
| DE | 19917022 | A1 | 10/2000 | |
| DE | 102008061852 | A1 | 6/2010 | |
| DE | 102015122174 | A1 | 6/2017 | |
| DE | 102020208696 | A1 * | 1/2022 | ............... B60R 3/02 |
| EP | 3130518 | A1 * | 2/2017 | ............... B60R 3/04 |
| KR | 20050120608 | A * | 12/2005 | |
| KR | 20140144385 | A * | 12/2014 | ............... B60R 3/02 |
| WO | 2020020559 | A1 | 1/2020 | |
| WO | 2020110550 | A1 | 6/2020 | |

\* cited by examiner

TREAD SYSTEM FOR A VEHICLE

CROSS-REFERENCE TO RELATED APPLICATIONS

This application claims the benefit of German patent application no. 20 2022 103 042.1 filed on 30 May 2022, the disclosure of which is incorporated herein by reference in its entirety.

TECHNICAL FIELD

The present disclosure relates to a tread system for a vehicle comprising a tread plate, which is movable, underneath a tread strip edge of the vehicle, from a retracted position in the direction towards a deployed position and vice versa along a deployment axis extending perpendicularly to the tread strip edge, wherein the tread plate has a tread surface capable of bearing tread loads, on which an anti-slip profile is formed, wherein the anti-slip profile has a plurality of profile elements, wherein each profile element is raised relative to a tread surface base and has a greater length along a respective longitudinal profile element axis than along a transverse profile element axis that extends perpendicularly to the longitudinal profile element axis and parallel to the tread surface base.

BACKGROUND

Tread systems with tread plates that can be moved between a retracted position and a deployed position are used, in particular, in passenger transport vehicles, e.g. in the area of public transport. One possibility is a use in, for example, road vehicles (e.g. buses) or rail vehicles (e.g. streetcars, subway cars, trams, commuter trains, long-distance trains, high-speed trains etc.). Tread systems are basically used for making boarding and exiting a vehicle easier; thus, they serve as an aid for entering and exiting. When a vehicle stops at a platform (for example), e.g. a train platform or bus platform, the vehicle is in a rest position, so that the passengers can enter the vehicle or leave the vehicle. In the process, it is almost inevitable that a gap between an outside of a vehicle and the platform needs to be bridged. Otherwise, a contact between the material of the outside of the vehicle and the platform would inevitably occur, which could result in the vehicle being damaged, e.g. in the form of damage to the body or paint.

If such a gap is too large, this may endanger or affect the passengers when entering the vehicle or exiting the vehicle. Accordingly, tread systems that are deployed or folded out in the direction of the platform when the vehicle is at rest constitute an option for reducing the size of the gap between the vehicle and the platform or train platform. Such a tread system may be configured, for example, as a tread plate and, when passengers enter or exit, takes up the weight of the passengers, i.e. is subjected to load by being stepped upon.

Frequently, a gap and/or a difference in height must also be bridged in the case of the vehicle stopping at a location without a platform provided for the purpose (e.g. in the area of a sidewalk). Here, a tread system (including a movable tread plate) may make entering and exiting the vehicle easier. A tread system may serve at least for bridging a difference in height between the level ground and the floor of the passenger compartment even in the case of the vehicle stopping on level ground; this is all the more the case for physically handicapped passengers, e.g. wheelchair users. Here, the tread plate of the tread system serves as a ramp.

In order to ensure a sufficiently safe footing for entering or exiting passengers and permit as long a life of the tread system in the case of permanent use, it is necessary for the tread system to have sufficient mechanical ruggedness. For this purpose, tread systems with tread plates or tread surfaces of metal are particularly suitable. Moreover, the tread surfaces may be provided with patterns or mats having an anti-slip effect and reducing the danger of slipping for the passenger when entering and exiting.

In order to form an anti-slip profile, so-called checker plates (e.g. made from stainless steel) are frequently used. Here, an anti-slip profile is formed on a sheet metal surface (which simultaneously provides a tread surface), namely in the form of a plurality of profile elements that are each raised relative to a tread surface base (of the metal sheet) and form a checkered pattern. The checkered pattern (provided by the profile elements) is produced when the metal sheet is manufactured by roll forming. As checkered patterns formed by the profile elements, duet or quintet patterns are known, for example, which are each composed of a plurality of structural units, with the structural units each comprising two or five profile elements in parallel orientation. In this case, the profile elements of adjacent structures are orientated in different directions, resulting in an overall non-directional checkered pattern. Indeed, an anti-slip effect is also provided by the checkered patterns; when such checker plates were used as tread plates in tread systems, it was found that the checker plates often could only be cleaned or swept insufficiently. Dirt particles deposited by passengers on the checker plates (e.g. in the form of dust, stones, soil or stone chips) remain between the profile elements of the checkered structures (even after cleaning or sweeping). Accordingly, there is a demand for systems improved in this regard.

SUMMARY

Thus, the present disclosure is based on providing a tread system whose tread plate can be cleaned in a simplified manner and with improved efficiency.

A tread system with the features of the independent claim is proposed in order to achieve the advantages set forth herein.

It must be noted that the features cited individually in the claims can be combined with each other in any technologically meaningful manner and represent other embodiments of the disclosure. The description, in particular in connection with the Figures, additionally characterizes and specifies the disclosure.

It may also be noted that a conjunction "and/or" used hereinafter, which is situated between two features and links them to each other, should always be interpreted such that, in a first embodiment of the subject matter according to the disclosure, only the first feature may be provided, in a second embodiment, only the second feature may be provided, and in a third embodiment, both the first and the second feature may be provided.

Accordingly, the present disclosure relates to a tread system for a vehicle comprising a tread plate, which is movable, underneath a tread strip edge of the vehicle, from a retracted position in the direction towards a deployed position and vice versa along a deployment axis extending perpendicularly to the tread strip edge, wherein the tread plate has a tread surface capable of bearing tread loads, on which an anti-slip profile is formed, wherein the anti-slip profile has a plurality of profile elements, wherein each profile element is raised relative to a tread surface base and has a greater length along a respective longitudinal profile element axis than along a transverse profile element axis that extends perpendicularly to the longitudinal profile element axis and parallel to the tread surface base. According to the disclosure, the tread system is characterized in that the profile elements are arranged in rows.

The above-mentioned tread strip edge is arranged between the floor level of a vehicle interior space and a cavity (e.g. deployment cassette) for accommodating the tread plate. The tread strip edge may be a constituent element of the external vehicle shell or of a deployment cassette, for instance. In particular, the tread plate is arranged underneath a lower edge of the tread strip edge.

The movement of the tread plate (which is preferably configured as a sliding tread) from a retracted position in the direction of a deployed position and vice versa is effected by means of a suitable drive device, which is not to be specified in more detail here. The tread plate may be configured to be capable of being lowered (pivoted) in order to provide a ramp function.

As was mentioned, the tread surface is configured to be capable of bearing tread loads, which means that the tread plate is capable of taking up the weight force exerted by the passengers on the tread plate when entering and exiting. An "anti-slip profile" is to be understood to mean that the danger of a passenger slipping when entering or exiting is reduced compared with a smooth surface. Metallic surfaces, in particular, may be smooth (if not profiled accordingly) and cause an increased risk of slipping. This effect becomes even more pronounced in wet conditions, which is why anti-slip profiles are almost indispensable in tread plates. Because both dirt and moisture are deposited on the tread plate due to the permanent contact with the shoes of passengers. In addition, precipitation such as rain, snow, hail or the like may directly deposit on the tread plate in the deployed position, whereby the danger of slipping may be increased even further. This is counteracted by the anti-slip profile.

As was mentioned, the profile elements are raised relative to the tread surface base. This means that the profile elements protrude or project upwards relative to a surface formed by the tread surface base. In other words, the profile element surfaces associated with the profile elements have a different (higher) vertical level in the vertical direction than the tread surface base.

As was mentioned, a respective profile element has, along its respective longitudinal profile element axis, a greater length than in a transverse profile element axis extending perpendicularly to the longitudinal profile element axis and parallel to the tread surface base. In other words, the profile elements have a greater length than width. Also, the profile elements have a greater length than height (in relation to a height from the tread surface base).

The row-by-row arrangement of the profile elements provides for a directional arrangement, whereby the cleaning/removal of dirt particles (e.g. in the form of dust, stones, soil of stone chips) deposited in intermediate spaces between the profile elements is made easier. If such a tread plate is swept along the orientation of the profile elements (i.e. cleaned in a directional manner), for instance, dirt particles are easier to remove than in the case of the checker plates known from the prior art.

Further configurations of the tread system proposed by the disclosure are described hereinafter. The following description includes those configuration features specified in the dependent claims but is not limited thereto.

According to a first embodiment of a tread system proposed by the disclosure, it may be provided that each row has a row axis along which a plurality of profile elements are arranged one behind the other in an aligned manner. Thus, the profile elements may be lined up one behind the other in a respective row. Preferably, the respective longitudinal profile element axes extend in the direction (i.e. parallel to) of the row axis. The rows of the profile elements arranged one behind the other may extend in a direction along the deployment axis across the entire length of the tread plate. This means that, in a respective row from a rear end of the tread plate to a front end of the tread plate, profile elements are arranged or lined up one behind the other.

According to another embodiment of a tread system proposed by the disclosure, it may be provided that the profile elements of rows that are arranged side-by-side are arranged at a row distance from one another. The row distance may be the same for all adjacent rows of profile elements. The row distance may be, for example, in the range of 1 mm to 20 mm, in particular 1 mm, 5 mm, 10 mm or mm. The row distance may equally also have other values. Depending on the row distance, dirt particles of different sizes (e.g. grain sizes) may accumulate between the rows. Consequently, the size of the depositing dirt particles may be set by means of the row distance. The row distance may vary according to customer requirements or application.

According to another embodiment of a tread system proposed by the disclosure, it may be provided that the profile elements that are arranged in a respective row one behind the other in an aligned manner are arranged in a spaced-apart manner or directly adjacent to one another. In the case of a directly adjacent arrangement, with respect to two profile elements arranged one behind the other, i.e. a front and a rear profile element, a rear end of the front profile element may be directly adjacent to a front end of the rear profile element (i.e. be in material contact). If profile elements are arranged in a spaced-apart manner, there is no material contact between the profile elements.

According to another embodiment of a tread system proposed by the disclosure, it may be provided that the profile elements each have a profile element tread surface capable of bearing tread loads, wherein the plurality of the profile elements span with their respective profile element tread surfaces a profile element tread surface plane that is parallel to the tread surface base. Preferably, the profile elements are arranged such that, when a passenger steps on the tread plate, they are contacted by a shoe sole of the passenger at least partially and temporarily and thus at least partially serve as a tread surface. With their respective profile element tread surfaces, the profile elements thus form an overall profile element tread surface whose profile element tread surface plane is arranged above the tread surface base. Depending on the profile of the shoe of the passenger, both the tread plate base and a part of the profile element tread surfaces may be in contact with the shoe sole when the tread plate is stepped upon, so that parts of a shoe sole rest on the tread plate base and parts of the shoe sole rest on the profile element tread surfaces, which cases an anti-slip effect. Physically, the above-mentioned anti-slip effect may be based on an increased friction between the shoe sole and the profiled tread surface or by a partial positive fit between the profile elements and the shoe sole. On the whole, it is to be noted that the profile elements provide the tread plate with a profile that reduces the danger of a passenger slipping or slipping off. In wet conditions, the anti-slip effect is particularly pronounced, because on the one hand, the water coming into contact with the tread plate may drain off via the tread plate base, on the other hand, the water accumulates to a greater extent on the tread plate base than on a surface of the profile elements, which is the reason why the profile elements provide for sufficient slip-resistance even under wet conditions. Also, water that has accumulated on the profile element surfaces can be displaced in the direction towards the tread surface base upon contact with a shoe sole.

According to another embodiment of a tread system proposed by the disclosure, it may be provided that the profile element tread surface of a respective profile element has an oval shape, a rectangular shape, an elliptical shape or a pointed elliptical shape. An at least partially rounded profile shape such as an oval shape, elliptical shape or the shape of a pointed ellipse may be advantageous with regard to cleaning or sweeping the tread plate, because brushes or bristles guided over the tread plate slide along the rounded profile elements. Brushes and bristles can slide along the edge of a rectangle also in the case of a rectangular shape, however, the danger of becoming jammed or wedged when the brushes or bristles slide along is increased in the transition region between two rectangular profile elements. In contrast, an at least partially rounded profile shape such as an oval shape, elliptical shape or the shape of a pointed ellipse is particularly gentle on the material of the brushes of the bristles, which increases their life span. The profile element may be directly built or formed, in the desired shape, from the tread plate material already when the tread plate is manufactured.

According to another embodiment of a tread system proposed by the disclosure, it may be provided that profile elements arranged in adjoining rows are arranged with a longitudinal offset. In this case, the longitudinal offset relates to a direction along the deployment axis, i.e. the profile elements in adjacent rows are not arranged directly one next to the other (i.e. not arranged parallel on the same level or the same row position). Thus, the anti-slip effect can be increased even further. According to another embodiment of a tread system proposed by the disclosure, it may be provided that adjoining rows have a different number of profile elements. Also in this manner, the longitudinal offset can be obtained and the anti-slip effect can be improved. With respect to a front edge of the tread plate, adjacent profile element rows thus do not end at the same level if a longitudinal offset is present. In other words, every second row may have the same arrangement or number of profile elements. According to another embodiment of a tread system proposed by the disclosure, it may be provided that one row that is next-but-one to another row has the same number of profile elements. In other words, every second row may include the same number of profile elements.

According to another embodiment of a tread system proposed by the disclosure, it may be provided that the row axes extend parallel to the deployment axis. Preferably, the longitudinal profile element axes thus also extend parallel to the deployment axis.

According to another embodiment of a tread system proposed by the disclosure, it may be provided that a brush structure, which has brush members configured for cleaning the tread surface of the tread plate when the tread plate is moved along the deployment axis, is arranged on the tread strip edge. In this case, it is advantageous for an efficient cleaning effect if the row axes (or longitudinal profile element axes) extend parallel to the deployment axis. Because dirt or dirt particles in intermediate spaces between adjacent rows can thus be swept away by the brush members in an effective manner. When the tread plate is moved, a part of the brush members can slide or be guided along the intermediate spaces arranged between the rows. The brush structure may also comprise brush members that slide or are guided across the surfaces of the profile elements and thus also clean those. Thus, the brush members do not have to be moved actively in order to clean the tread plate; rather, they remain stationary. In one variant, however, it may be provided that the brush structure as a whole also be moved relative to the tread plate, e.g. in the opposite direction to the direction of movement of the tread plate. Alternatively or additionally, a movement of the brush structure in the direction transverse to the deployment axis of the tread plate may also be provided. Moreover, individual brush members may be moved in the opposite or transverse direction to the direction of movement of the tread plate. If a movement of the brush structure of individual brush members is desired, they are movably mounted and driven in accordance with the desired movement. It is also conceivable to mount individual brush members (or all brush members) in a non-driven but movable manner, e.g. by means of ball joints associated with the respective brush members.

According to another embodiment of a tread system proposed by the disclosure, it may be provided that the brush structure has first brush members and second brush members, wherein the first brush members have a first length in the direction of the tread plate, and wherein the second brush members have a second length in the direction of the tread plate, wherein the first length and the second length deviate from one another. According to another embodiment of a tread system proposed by the disclosure, it may be provided that the first brush members are configured for contacting the tread surface base when the tread plate moves along the deployment axis, and wherein the second brush members are configured for contacting the profile element tread surfaces when the tread plate moves along the deployment axis. Those brush members provided for contacting the tread surface base advantageously have a greater length than those second brush members provided for contacting the profile element tread surfaces (or profile element surfaces). Thus, the first brush members can sweep off the tread surface base, while the second brush members sweep of the profile element tread surfaces.

In another embodiment, it may be provided that the first brush members and the second brush members do not directly contact the respective tread surface bases or profile element tread surfaces, but are arranged at a slight distance therefrom with their lower ends. Those particles that have a size exceeding the above-mentioned distance can then also be removed.

According to another embodiment of a tread system proposed by the disclosure, it may be provided that the first and second brush members are each arranged in brush member rows extending perpendicularly to the deployment axis, wherein the first brush members are arranged in a first brush member row and the second brush members in a second brush member row. In this case, the first brush member row and the second brush member row may be arranged one behind the other, wherein, in a first variant, the first brush member row may provide a front row towards the outside of the vehicle, and the second brush member row may provide a rear row towards the outside of the vehicle. In a second variant, the second brush member row may provide a front row towards the outside of the vehicle, and the first brush member row may provide a rear row towards the outside of the vehicle.

According to another embodiment of a tread system proposed by the disclosure, it may be provided that the first brush members and the second brush members are arranged together in one or several brush member row(s) extending perpendicularly to the deployment axis, wherein the first and second brush members are arranged in an alternating manner in a respective brush member row. This may mean that every second brush member may be a first or second brush member.

According to another embodiment of a tread system proposed by the disclosure, it may be provided that the first brush members and the second brush member are configured in the form of bristles. The bristles may be made from a synthetic or natural material. Natural materials may be plant or animal materials. Coconut or arenga bristles may be mentioned as examples for a natural bristle material. Animal-based bristles may be made from horsehair, for instance. Synthetically made bristles may be made from PVC, polypropylene, polyester, polyamide or similar materials, for example. Combinations of plant and synthetic materials may also be used for producing bristles. Thus, the bristles may be single-component or multi-component bristles. The bristles may be made from composite materials. The bristles may also be completely or partially produced from naturally or synthetically produced rubber.

According to another embodiment of a tread system proposed by the disclosure, it may be provided that the first brush members have a bristle diameter which is less than or equal to the row distance of adjacently arranged profile elements. Then, the intermediate spaces between the rows of profile elements can be guided along the respective first brush members and cleaned when the tread plate is moved. If the first brush members have a bristle diameter smaller than the above-mentioned row distance, then—depending on the bristle diameter—several of the first brush members can be positioned within an intermediate space arranged between two rows and guided along the intermediate space when the tread plate is moved.

BRIEF DESCRIPTION OF THE DRAWINGS

The disclosure is further explained with reference to the following Figures. They should be understood merely to be an example, and are not supposed to limit the disclosure.

In the Figures.

DETAILED DESCRIPTION OF THE DRAWINGS

Figure 1:
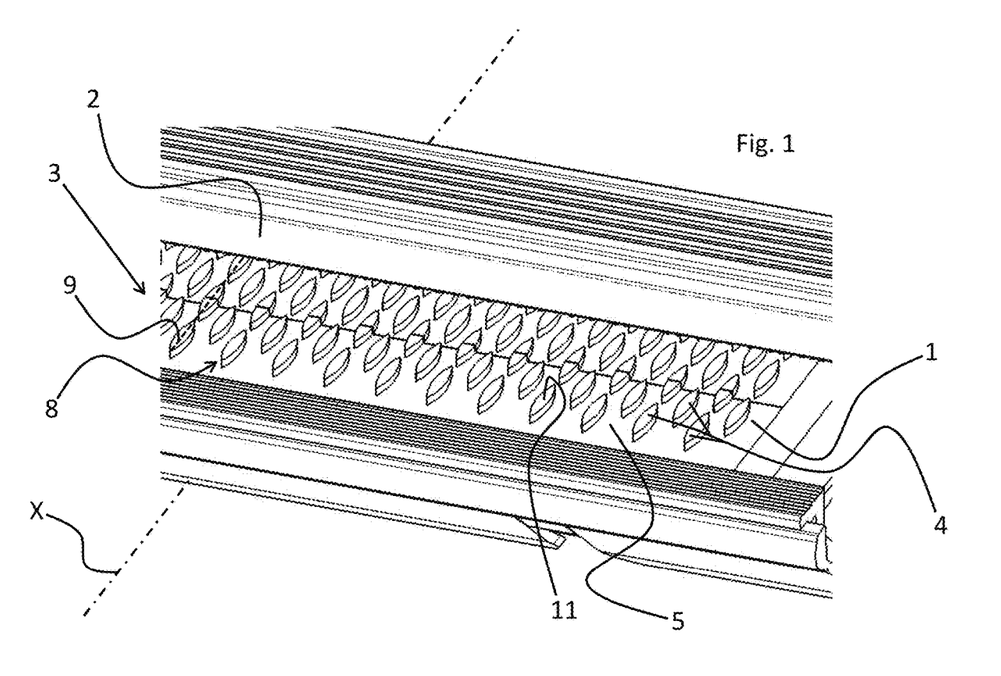
FIG. 1 shows a perspective view of a section of a tread plate associated with the tread system according to the disclosure.

FIG. 1 presents a tread system for a vehicle (the vehicle is not shown), comprising a tread plate 1, which is movable, underneath a tread strip edge 2 of the vehicle, from a retracted position in the direction towards a deployed position and vice versa along a deployment axis X extending perpendicularly to the tread strip edge 2. The tread plate 1 has a tread surface 3 capable of bearing tread loads, on which an anti-slip profile is formed, wherein the anti-slip profile has a plurality of profile elements 4. Each profile element 4 is raised relative to a tread surface base 5 and has a greater length along a respective longitudinal profile element axis 6 than along a transverse profile element axis 7 that extends perpendicularly to the longitudinal profile element axis 6 and parallel to the tread surface base 5 (this relationship is shown in detail in FIG. 3).

As can be clearly seen particularly in FIG. 1, the profile elements 4 are arranged in rows 8. Each row 8 has a row axis 9 along which a plurality of profile elements 4 are arranged one behind the other in an aligned manner. The row axes 9 extend parallel to the deployment axis X. The profile elements 4 of rows 8 that are arranged side-by-side are arranged at a row distance from one another. The row distance is defined as the smallest distance, in a direction perpendicular to the deployment axis X, between the profile elements 4 of two adjacent rows 8 in relation to opposing outer edges of the profile elements 4. In other words, the row distance is defined as the smallest distance (width) of the intermediate space 10 present between two adjacent rows 8 of profile elements 4. In the exemplary embodiment shown here, the profile elements 4 that are arranged one behind the other in an aligned manner in a respective row 8 are arranged in a spaced-apart manner (see FIGS. 1, 3). Nevertheless, the profile elements 4 may also be arranged directly adjacent to one another.

Figure 3:
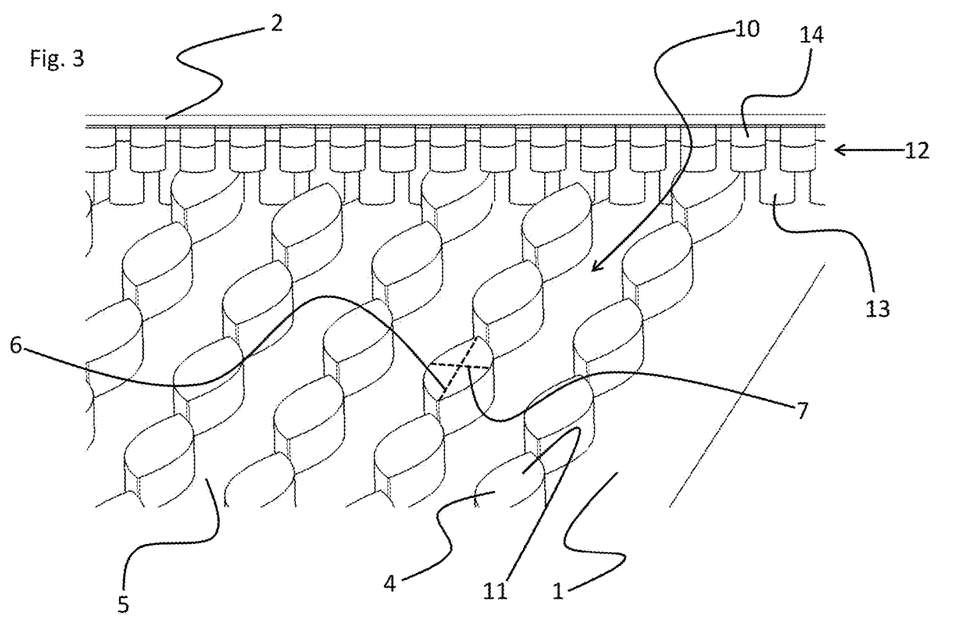
FIG. 3 shows an enlarged perspective view of a section of a tread plate associated with the tread system according to the disclosure including the brush structure.
Figure 4:
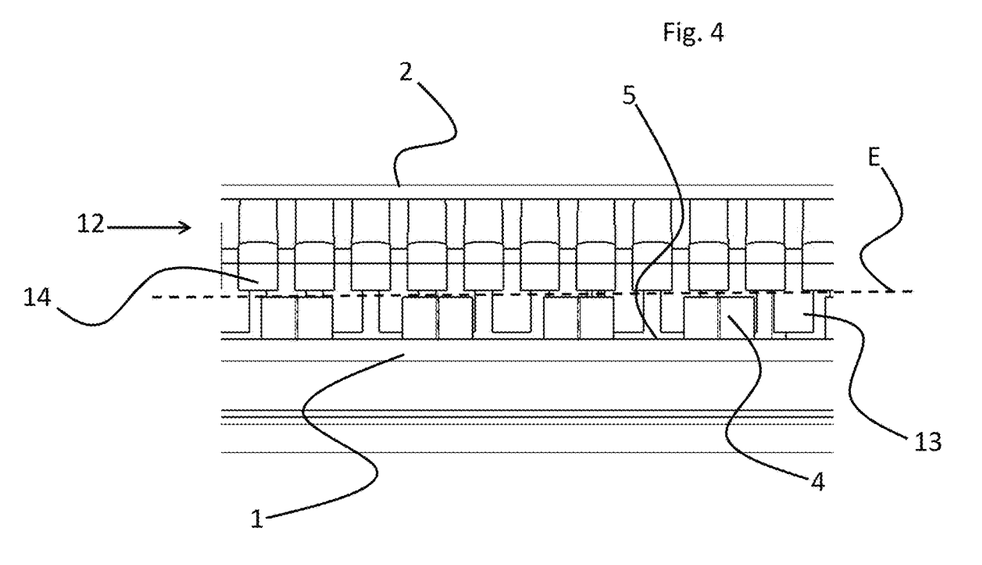
FIG. 4 shows a front view of a tread plate according to FIGS. 1 to 3 including a brush structure.

The profile elements 4 each have a profile element tread surface 11 capable of bearing tread loads in the shape of a pointed ellipse. Moreover, with their respective profile element tread surfaces 11, the profile elements 4 thus form a profile element tread surface E parallel to the tread surface base 5 (FIGS. 3, 4). Profile elements 4 arranged in adjoining rows 8 are arranged with a longitudinal offset.

Figure 2:
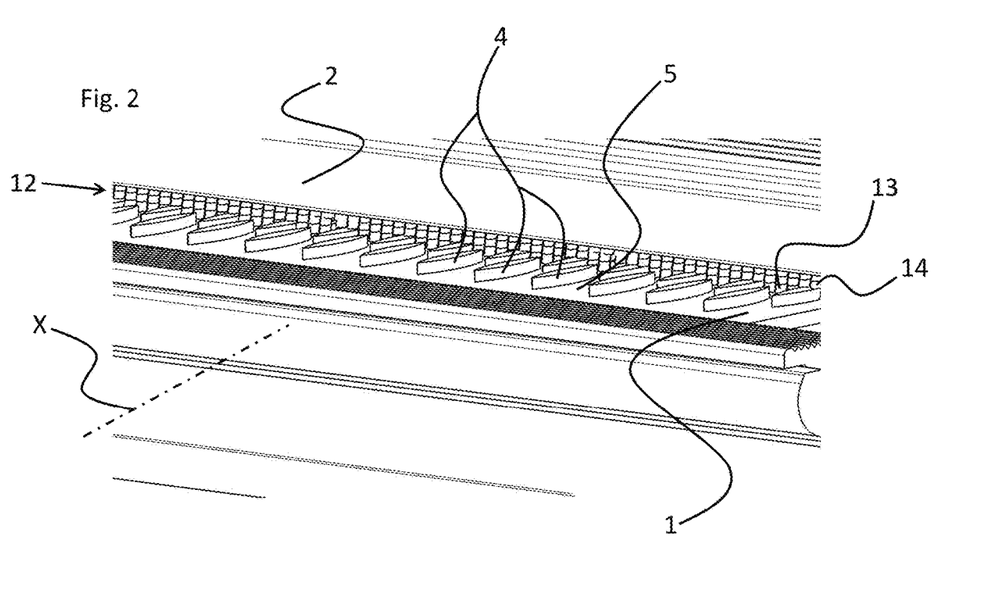
FIG. 2 shows a perspective view of a section of a tread plate associated with the tread system according to the disclosure including a brush structure arranged on a tread strip edge for cleaning the tread plate.

As shown in FIGS. 2, 3 and 4, a brush structure 12, which has brush members 13, 14 configured for cleaning the tread surface 3 of the tread plate 1 when the tread plate 1 is moved along the deployment axis X, is arranged on the tread strip edge 2. The brush structure 12 has first brush members 13 and second brush members 14, wherein the first brush members 13 have a first length in the direction of the tread plate 1, and wherein the second brush members 14 have a second length in the direction of the tread plate 1, wherein the first length and the second length deviate from one another. The first brush members 13 may be configured for contacting the tread surface base 5 when the tread plate 1 moves along the deployment axis X (i.e. for dragging or sweeping across the tread surface base 5 in a cleaning manner). Moreover, the second brush members 14 may be configured for contacting the profile element tread surfaces 11 when the tread plate 1 moves along the deployment axis X (i.e. for dragging or sweeping across the profile element tread surfaces 11 in a cleaning manner).

Nevertheless, the first brush members 13 may be configured and arranged such that their lower ends are arranged at a slight distance from the tread surface base i.e. do not drag across the tread surface base 5. The same may also apply to the second brush members 14 in relation to the profile element tread surfaces 11, i.e. the second brush members 14 may be arranged with their respective lower ends at a slight distance from the profile element tread surfaces 11, i.e. not drag across the profile element tread surfaces 11. If particles to be removed (dirt particles, stones, stone chips) are greater than the above-mentioned distance, these particles can nevertheless be removed and taken along by the brush members 13, 14.

As shown in FIG. 3, the first and second brush members 13, 14 are each arranged in brush member rows extending perpendicularly to the deployment axis X, wherein the first brush members 13 are arranged in a first (here: rear) brush member row and the second brush members 14 in a second (here: front) brush member row. In relation to the associated extending direction of the brush structure 12, the first brush members 13 and 14 are arranged with perpendicularly offset to the deployment axis X. This means that the first and second brush members 13, 14 arranged in the respective bristle member rows are not arranged directly one behind the other, but slightly offset, e.g. by half a diameter (or half a bristle diameter) of the brush members 13, 14. The first brush members 13 and the second brush members 14 are configured in the form of bristles (see FIGS. 2 to 4). The first brush members 13 have a bristle diameter which is less than or equal to the row distance of adjacently arranged profile elements 4. Thus, one or several (see FIG. 3, 4) first brush members can clean or sweep clean the intermediate space 10 between the profile elements 4.

The invention claimed is:

1. A tread system for a vehicle comprising: a tread plate, which is movable, underneath a tread strip edge of the vehicle, from a retracted position in the direction towards a deployed position and from the deployed position towards the retracted position along a deployment axis extending perpendicularly to the tread strip edge, wherein the tread plate has a tread surface capable of bearing tread loads, on which an anti-slip profile is formed, wherein the anti-slip profile has a plurality of profile elements, wherein each profile element is raised relative to a tread surface base and has a greater length along a respective longitudinal profile element axis than along a transverse profile element axis that extends perpendicularly to the longitudinal profile element axis and parallel to the tread surface base, wherein the profile elements are arranged in rows, wherein a brush structure, which has brush members configured for cleaning the tread surface of the tread plate when the tread plate is moved along the deployment axis, is arranged on the tread strip edge, wherein the brush structure has first brush members and second brush members, wherein the first brush members have a first length in the direction of the tread plate, and wherein the second brush members have a second length in the direction of the tread plate, wherein the first length and the second length deviate from one another.

2. The tread system according to claim 1, wherein each row has a row axis along which a plurality of profile elements are arranged one behind the other in an aligned manner.

3. The tread system according to claim 2, wherein the profile elements that are arranged in a respective row one behind the other in an aligned manner are arranged in a spaced-apart manner or directly adjacent to one another.

4. The tread system according to claim 2, wherein the row axes extend parallel to the deployment axis.

5. The tread system according to claim 1, wherein the profile elements of rows that are arranged side-by-side are arranged at a row distance from one another.

6. The tread system according to claim 1, wherein the profile elements each have a profile element tread surface capable of bearing tread loads, wherein the plurality of the profile elements span with their respective profile element tread surfaces a profile element tread surface plane that is parallel to the tread surface base.

7. The tread system according to claim 6, wherein the profile element tread surface of a respective profile element has an oval shape, a rectangular shape, an elliptical shape, or a pointed elliptical shape.

8. The tread system according to claim 1, wherein profile elements arranged in adjoining rows are arranged with a longitudinal offset.

9. The tread system according to claim 1, wherein adjoining rows have a different number of profile elements.

10. The tread system according to claim 9, wherein a row that is next-but-one to a row has the same number of profile elements.

11. The tread system according to claim 1, wherein the first brush members are configured for contacting the tread surface base when the tread plate moves along the deployment axis, and wherein the second brush members are configured for contacting the profile element tread surfaces when the tread plate moves along the deployment axis.

12. The tread system according to claim 1, wherein the first and second brush members are each arranged in brush member rows extending perpendicularly to the deployment axis, wherein the first brush members are arranged in a first brush member row and the second brush members in a second brush member row.

13. The tread system according to claim 12, wherein the first brush member row and the second brush member row are arranged one behind the other.

14. The tread system according to claim 1, wherein the first brush members and the second brush members are arranged together in one or several brush member row(s) extending perpendicularly to the deployment axis, wherein the first and second brush members are arranged in an alternating manner in a respective brush member row.

15. The tread system according to claim 1, wherein the first brush members and the second brush members are configured in the form of bristles.

16. The tread system according to claim 15, wherein the first brush members have a bristle diameter which is less than or equal to the row distance of adjacently arranged profile elements.

* * * * *